No. 730,002. Patented June 2, 1903.

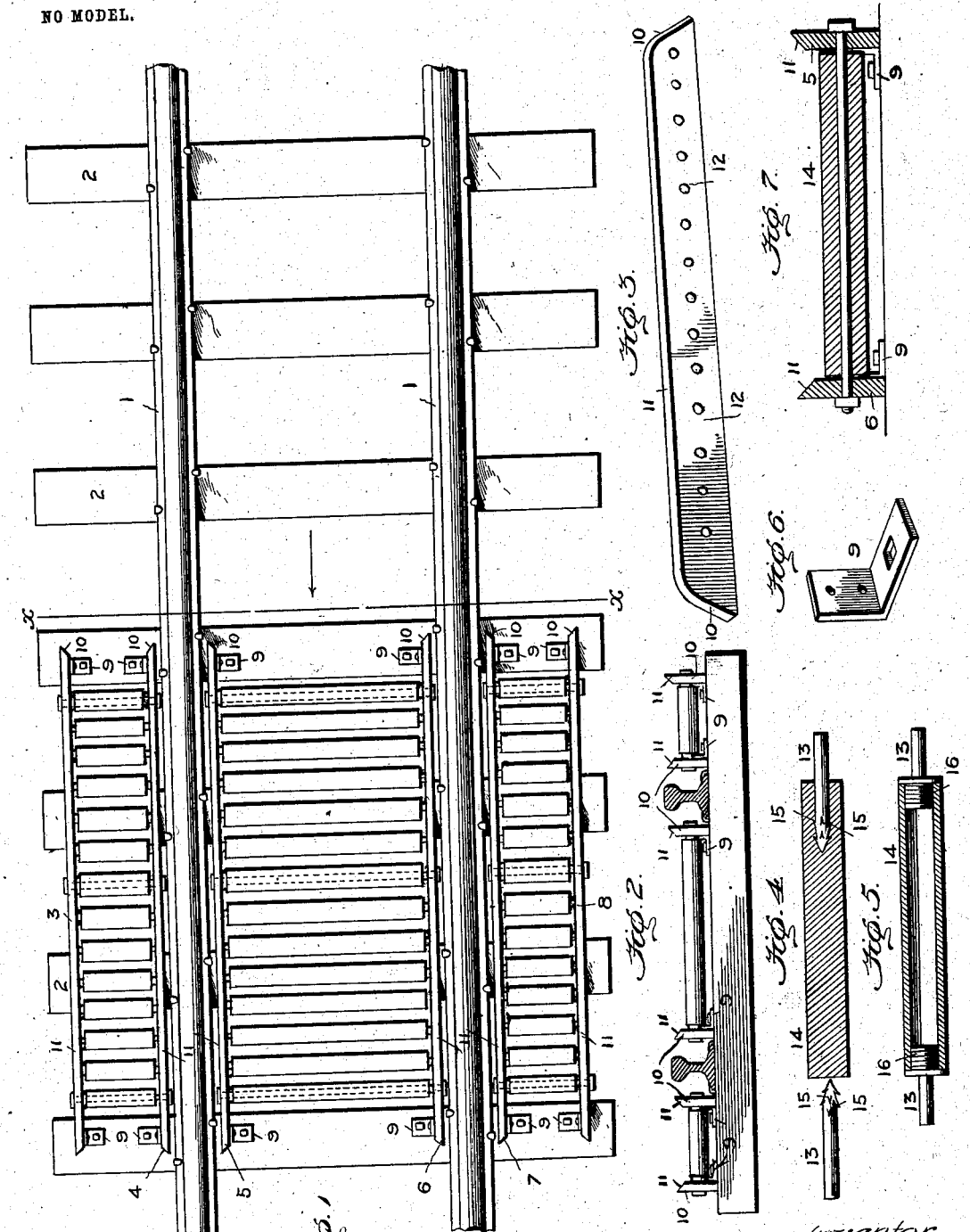

UNITED STATES PATENT OFFICE.

LUTHER W. CARDEN, OF CRESTVIEW, TENNESSEE.

CATTLE-GUARD.

SPECIFICATION forming part of Letters Patent No. 730,002, dated June 2, 1903.

Application filed February 4, 1902. Serial No. 92,557. (No model.)

*To all whom it may concern:*

Be it known that I, LUTHER W. CARDEN, a citizen of the United States, residing at Crestview, county of Lawrence, and State of Tennessee, have invented certain new and useful Improvements in Cattle-Guards, of which the following is a specification.

My invention relates to cattle-guards.

The object of the present invention is the provision of an improved and novel cattle-guard of simple and inexpensive construction which will be strong and durable and not liable to get out of order and one which will absolutely prevent domestic animals—such as horses, cows, hogs, &c.—from traversing the railway-track where the guard is located and will satisfactorily foil every attempt of an animal to cross it, but which will in no manner injure or punish the animal.

Another object of the invention is the provision of a cattle-guard which will in no manner catch or retain any object which may be dragged along by a passing train.

Having the foregoing and other not specifically-mentioned objects in view, the invention consists of a cattle-guard comprising certain improved features and novel combinations and adaptations of parts set forth in detail hereinafter and recited in the appended claims.

In the accompanying drawings, Figure 1 is a plan view; Fig. 2, a transverse section on line *x x* of Fig. 1; Fig. 3, a perspective detail of one of the side bars; Figs. 4 and 5, details showing the construction of wooden and metal rollers which may be employed; Fig. 6, a detail of one of the angle-irons for securing the side bars, and Fig. 7 a detail view showing how the side bars may be braced by rods running through the middle and end rollers.

The numeral 1 designates the rails, and 2 the ties of a railroad-track.

The side bars of my cattle-guard are shown at 3, 4, 5, 6, 7, and 8, a pair being located outside of each rail and another pair between the rails. The side bars 5 and 6 are only separated from the rails 1 a sufficient distance to permit the flanges of the car-wheels to pass, and the side bars 4 and 7 are separated a minimum distance from the rails, on the outside thereof, so as to prevent animals from walking between the rails and the said side bars. All of the side bars may be of suitable height, thickness, and length to meet the requirements of the situation, and they are held in vertical position parallel to the rails 1 of the track by angle-irons 9, secured to the ties 2 and to said side bars, these angle-irons being preferably located at the ends of the side bars and at the center thereof. These side bars are beveled to a point at their ends 10 to prevent any catching of any matter which may be dragged under the cars by passing trains, and the upper edges of the side bars are beveled at 11 inwardly—that is, in the direction of the inner faces of the side bars—so that if an animal should attempt to walk along the upper edges of the side bars the beveled portions would cause the foot or hoof to slip off inwardly. The side bars are provided with apertures or perforations 12 at suitable intervals, the series extending in the direction of the length of the side bars and the apertures in one side bar being located at the same height and directly opposite corresponding apertures in the other side bar of that pair. These apertures constitute bearings for the gudgeons 13 of rollers 14 and permit the said rollers to turn freely. These rollers may be of wood or metal and are perfectly cylindrical and smooth on their outer surfaces, so that there is no projecting part to catch the hoof or foot of an animal, and the slightest pressure on any roller will cause it to turn. The apertures 12 are so spaced that the foot of a horse or cow will pass down between the rollers, but just far enough to tilt the animal's toes or fore part of the foot straight down and cause the ankle or knee to give way, the bend making it impossible for the animal to stand upright upon the guard. This occurs when the animal first puts the front feet on the first rollers. After one or two trials the animal will give up the attempt to walk on the guard and back out without any injury. A hog attempting to walk onto the guard will have his feet precipitated clear through the space between the rollers, as the rollers will be spaced sufficiently far apart to permit this, while preventing the foot of a cow or horse or large animal from passing entirely through the space between the rollers. The guard will consequently foil every attempt of a hog to walk upon it.

In Figs. 4 and 5 I have illustrated wooden and metal rollers which can be conveniently employed in connection with my cattle-guard. In Fig. 4 the gudgeons 13 have pointed ends provided with barbs 15 and are driven directly into the wooden roller 14 for a distance of several inches, and thus are permanently secured and afford suitable journals for the rollers, which are received in the apertures 12 and permit the roller to turn freely therein. In Fig. 5 the roller 14 is a hollow or tubular one, and the gudgeons 13 have screw-threaded plugs 16, which are screwed tightly into the ends of the roller. By the employment of rollers which are perfectly smooth and cylindrical I obtain results heretofore impossible to obtain in cattle-guards, for the slightest contact with any roller will cause it to freely turn, with the results heretofore set forth. Another important feature of my invention is that by the provision of the beveled upper edges of the side bars walking on the same by an animal is absolutely prevented. Again, the beveling of the ends of the side bars is of decided advantage in preventing an accumulation of trash on the guard, which might otherwise occur as a result of matter dragged along by passing trains.

Having thus described my invention, what I claim as new, and desire to secure by Letters Patent, is—

1. In a cattle-guard, the combination with side bars having inwardly-beveled upper edges, of rollers journaled to said side bars.

2. In a cattle-guard, the combination with side bars having inwardly-beveled upper edges, of smooth cylindrical rollers journaled in said side bars.

3. A railway cattle-guard, comprising a plurality of rectangular frames provided with means for their attachment to the railway-ties, and a series of parallel rollers journaled in each of said frames, each of said rollers consisting of a metallic tube interiorly threaded at its opposite ends and screw-plugs screwed in said threaded ends and each provided with an integral journal, the said journals being journaled in the ends of the said frames, substantially as described.

4. A railway cattle-guard, comprising side bars connected to the railway-ties, and a series of parallel rollers journaled in said side bars, said rollers each consisting of a metallic tube interiorly threaded at its opposite ends and screw-plugs screwed in said threaded ends and each provided with an integral journal, the said journals being journaled in the side bars.

In testimony whereof I hereunto affix my signature in presence of two witnesses.

LUTHER W. CARDEN.

Witnesses:
JENNIE A. DAWES.
WALTER B. WILLEY.